(12) United States Patent
Kingsbury

(10) Patent No.: US 6,260,882 B1
(45) Date of Patent: Jul. 17, 2001

(54) TRAILER LANDING GEAR LIFTING APPARATUS

(75) Inventor: Richard A. Kingsbury, Pleasanton, CA (US)

(73) Assignee: Quest Transportation Products, Inc., San Jose, CA (US)

(*) Notice: Subject to any disclaimer, the term of this patent is extended or adjusted under 35 U.S.C. 154(b) by 0 days.

(21) Appl. No.: 09/392,977

(22) Filed: Sep. 9, 1999

Related U.S. Application Data

(63) Continuation-in-part of application No. 09/075,495, filed on May 8, 1998, now Pat. No. 6,086,099.

(51) Int. Cl.$^7$ ................................................ B60S 9/02
(52) U.S. Cl. ................................... 280/766.1; 254/219
(58) Field of Search .......................... 280/763.1, 766.1, 280/475; 254/418, 419, 424, 425

(56) References Cited

U.S. PATENT DOCUMENTS

| | | | |
|---|---|---|---|
| 2,817,493 | * 12/1957 | Belcher . | |
| 2,959,395 | 11/1960 | Strack et al. ........................ | 254/86 |
| 3,136,527 | * 6/1964 | Griffis . | |
| 3,182,956 | * 5/1965 | Dalton . | |
| 3,201,087 | 8/1965 | Dalton ................................. | 254/86 |
| 3,402,915 | * 9/1968 | Dalton . | |
| 3,726,543 | 4/1973 | Dalton ................................. | 280/150.5 |
| 4,097,840 | * 6/1978 | Chappelle .......................... | 340/431 |
| 4,116,315 | 9/1978 | Vandenberg ....................... | 192/48.92 |
| 4,129,322 | * 12/1978 | Kuntz, Jr. ........................... | 254/419 |
| 4,318,550 | 3/1982 | Jacobsen ............................ | 280/766 |
| 4,345,779 | 8/1982 | Busby ................................. | 280/766 |
| 4,400,986 | 8/1983 | Swanson et al. ................... | 74/128 |
| 4,402,526 | 9/1983 | Huetsch ............................. | 280/766.1 |
| 4,466,637 | 8/1984 | Nelson .............................. | 280/766.1 |
| 4,928,488 | 5/1990 | Hunger .............................. | 60/480 |
| 5,004,267 | 4/1991 | Busby ................................. | 280/766.1 |
| 5,050,845 | 9/1991 | Aline et al. ........................ | 254/419 |
| 5,112,182 | 5/1992 | Nuttall .............................. | 414/481 |
| 5,125,679 | * 6/1992 | Delano ............................. | 280/425.5 |
| 5,299,829 | 4/1994 | Rivers, Jr. et al. ................ | 280/766.1 |
| 5,427,002 | 6/1995 | Edman ............................... | 81/57 |
| 5,451,076 | 9/1995 | Burkhead ......................... | 280/776.1 |
| 5,911,437 | 6/1999 | Lawrence ........................ | 280/766.1 |

FOREIGN PATENT DOCUMENTS 41 27 791 A1  2/1993 (DE) ................................. B60S/9/10

* cited by examiner

*Primary Examiner*—Kevin Hurley
(74) *Attorney, Agent, or Firm*—Henneman & Saunders; Larry E. Henneman, Jr.

(57) ABSTRACT

A trailer landing gear lifting apparatus (100) for raising and lowering landing gear (10) of a trailer (30) has a motor (136) fitted to a motor plate (134) which is affixed to a modified conventional gear housing cover (130) of a trailer landing gear assembly (10). The motor (136) has a motor gear (154) affixed to a motor shaft (156) by a roll pin (158). The motor gear (154) engages a drive low gear (142) of a generally conventional gear system (136). A spacer on a drive shaft 138 locks the gear system (136) such that the drive low gear (142) engages a driven low gear (146). A key switch (172) controls a pair of solenoids (170) to selectively provide power to the motor (136) for raising and lowering the legs (14) of the landing gear assembly (10).

3 Claims, 3 Drawing Sheets

TRAILER LANDING GEAR LIFTING APPARATUS

CROSS REFERENCE TO RELATED APPLICATIONS

This application is a Continuation in Part of U.S. patent application Ser. No. 09/075,495, filing date May 8, 1998; U.S. Pat. No. 6,086,099; entitled TRAILER LANDING GEAR LIFTING APPARATUS, having an inventor in common herewith, which is incorporated by reference herein in its entirety.

TECHNICAL FIELD

The present invention relates to the field of mechanical motor vehicle accessories, and more specifically to an improved apparatus for raising and lowering the landing gear of semi trailers. The predominant current usage of the present inventive landing gear lifting apparatus is for raising and lowering the landing gear of large commercial semi trailers, wherein it is desirable to provide a reliable and inexpensive alternative to hand cranking the landing gear thereof.

BACKGROUND ART

Trailers of tractor/trailer combinatinations have conventionally used landing gear, generally consisting of a pair of retractable legs, at the front ends of the trailers to support such front ends when the tractor is to be detached from the trailer. FIG. 1 depicts a conventional landing gear assembly 10. As can be seen in the view of FIG. 1, the landing gear 10 has a driven shaft 12 which passes through the upper ends of a pair of telescoping legs 14. Each leg 14 has an outer rectangular body 16 in which an inner rectangular portion 18 is telescopically received. Conventional gear mechanisms (not shown) cause the inner rectangular portion 18 to raise or lower, depending upon the direction of rotation of the driven shaft 12. A gear reduction box 20 is conventionally provided as depicted in FIG. 1. The gear reduction box will generally provide two gear ratios, which are generally 1/1 (meaning one inch of lift per rotation of a driving shaft 22) or 40/1 (meaning one inch of lift per forty rotations of the driving shaft 22). On the prior art conventional devices, a crank handle 24 is affixed to the driving shaft 22 by a removable pin 26. Accordingly, rotation of the crank handle 24 will selectively raise or lower the legs 14 of the landing gear 10.

As can be appreciated, raising and lowering the landing gear 10 using the manual crank handle 24 is both laborious and time consuming. A number of devices have been devised for raising and lowering the landing gear 10 by powered devices. Most of these have been hydraulically powered, although other power means have been used for the purpose. However, the fact that the old fashioned hand crank still predominates in the field speaks to the fact that known devices are, for one reason or another impractical.

The copending U.S. patent Application Ser. No. 09/075,494, having an inventor in common with this present application, has taught a pneumatic and/or electrical device for raising and lowering the landing gear 10. While this invention has achieved its goals admirably, it is accepted that a simpler, or less expensive, or more reliable alternative is generally desirable. Indeed, it is often the simpler alternatives which are less obvious, becoming understood only after experience with earlier, more cumbersome, devices is accrued. Accordingly, although the device taught by the '494 Application has provided an improvement over the manual method, which has been the standard mode of operation for many years, there remains the desirability to provide an even more effective alternative.

SUMMARY

Accordingly, it is an object of the present invention to provide a landing gear actuating apparatus which is reliable in operation.

It is another object of the present invention to provide a landing gear actuating apparatus which is inexpensive to manufacture.

It is yet another object of the present invention to provide a landing gear actuating apparatus which is easy to use.

It is still another object of the present invention to provide a landing gear actuating apparatus which is safe to use.

It is yet another object of the present invention to provide a landing gear actuating apparatus which can be adapted for use with essentially any type of trailer landing gear.

Briefly, one embodiment of the present invention is a replacement gear housing cover which replaces the conventional cover of a trailer landing gear assembly. The replacement gear cover has a motor with a drive gear attached for electrically raising and lowering the trailer landing gear. Power for this embodiment is provided by a battery which is kept charged from the trailer electrical system. An alternative is to power the inventive apparatus directly from the trailer electrical system. An electrical control system controls the inventive trailer landing gear lifting apparatus, and provides safety features therefore.

An advantage of the present invention is that it is sufficiently simple to be inexpensive enough such that it provides a viable alternative to hand cranking.

Yet another advantage of the present invention is that it is powerful and will quickly and easily raise and lower even the heaviest trailers.

Still another advantage of the present invention is that it is simple and reliable in operation.

Yet another advantage of the present invention is that it is generally permanently affixed to a trailer, and thus cannot be readily stolen or lost. These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed objects and advantages are not essential elements of the present invention, and should not be construed as limitations.

DETAILED DESCRIPTION OF THE INVENTION

Figure 1:
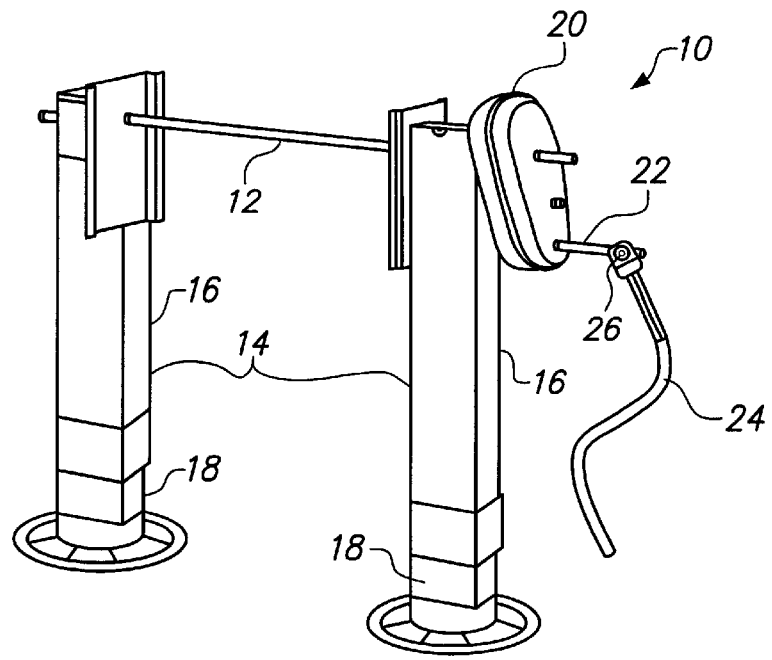
FIG. 1 is a perspective view of a conventional (prior art) landing gear assembly.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future, or such as may be found to be acceptable substitutes in the future. The invention may also be modified for a variety of applications while remaining within the spirit and scope of the claimed invention, since the range of potential applications is great, and since it is intended that the present invention be adaptable to many such variations.

Figure 2:
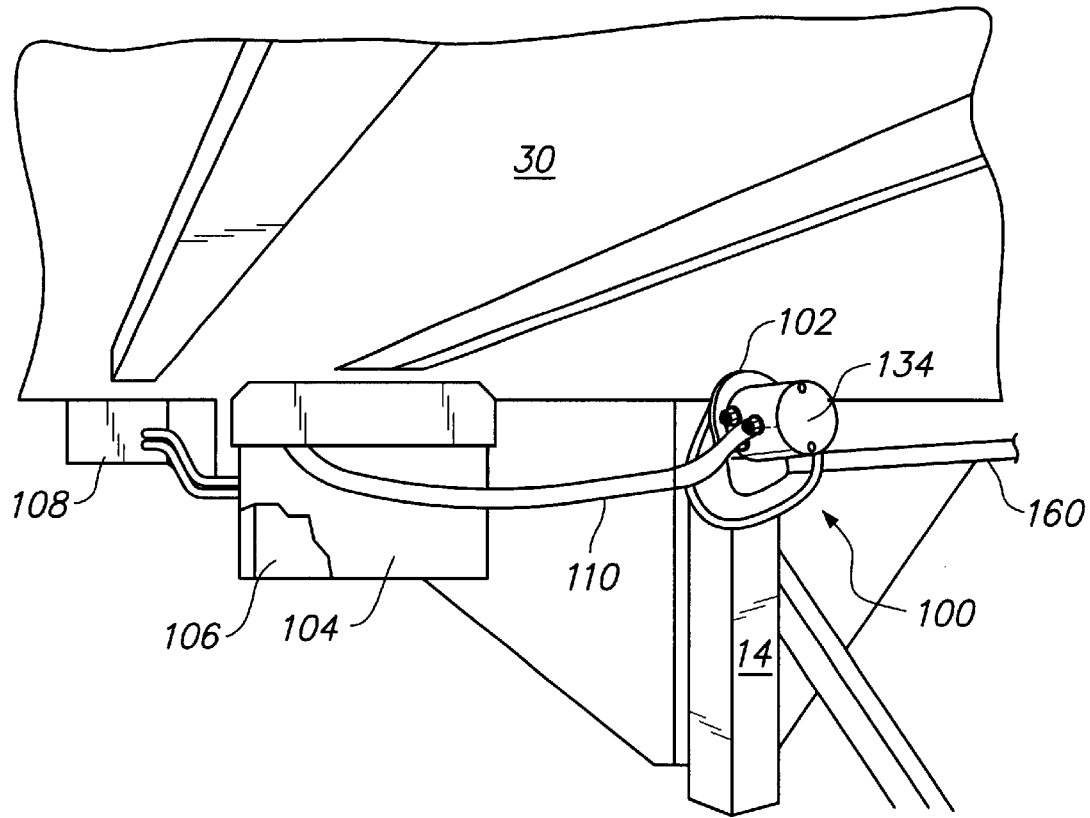
FIG. 2 is a partially cut away perspective view of a portion of a trailer having a motorized landing gear lifting assembly, according to an example of the present invention.

One particular embodiment for carrying out the invention mode for carrying out the invention is a modified trailer landing gear lifting assembly adapted for raising and lowering the landing gear of semi trailers. The inventive trailer landing gear lifting assembly is depicted in a partially cut away perspective view in FIG. 2 and is designated therein by the general reference character 100. In the view of FIG. 2, the trailer landing gear lifting apparatus 100 is shown affixed to the front end of a trailer 30. The trailer landing gear lifting apparatus 100 has a gear assembly 102, a battery box 104 containing a battery 106, a control panel 108 (shown from the rear in the view of FIG. 2), and a connecting cable 110. It should be noted that, in this example of the invention, the gear assembly 102 is mounted on the inside of the leg 14, although one skilled in the art will recognize that such gear assemblies 102 can be mounted on either the inside our outside of the leg 14.

Figure 3:
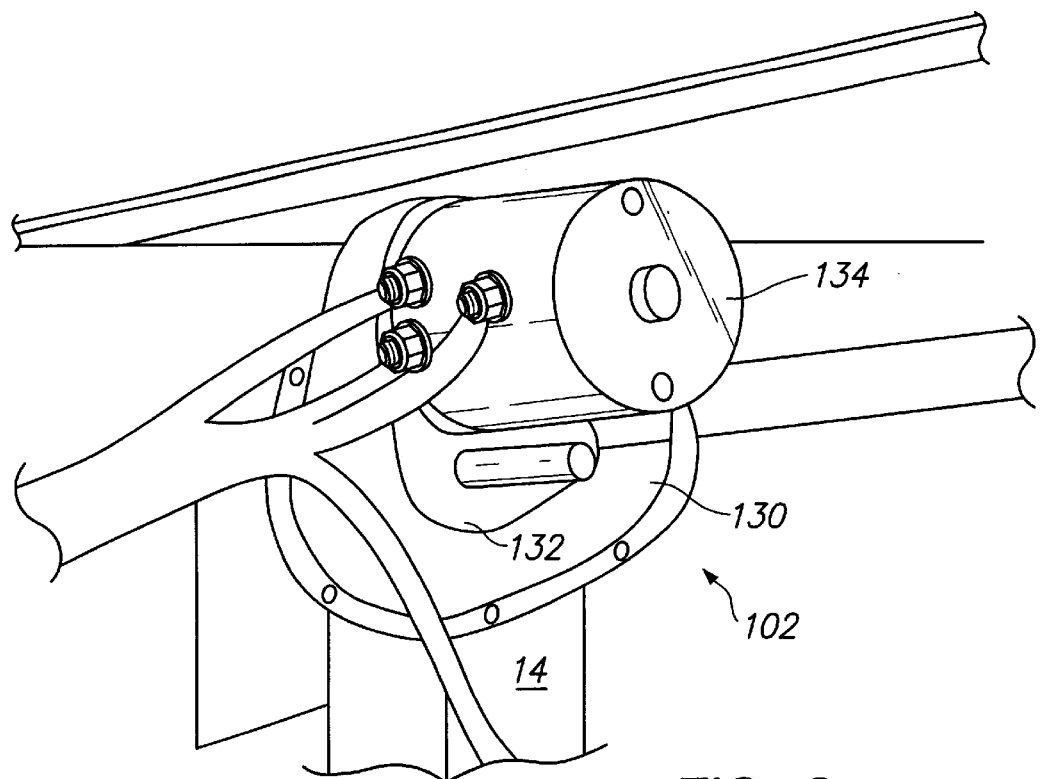
FIG. 3 is a more detailed perspective view of the gear assembly of FIG. 3.

FIG. 3 is a more detailed perspective view of the gear assembly 102 of the present invention. The gear assembly has a gear housing cover 130 which, in this embodiment of the invention, is constructed from a conventional gear housing cover such as is normally provided with the stock conventional gear reduction box 20 (FIG. 1). In this example of the invention, the gear reduction box 20 is an Eagle™ brand gear reduction box, although one skilled in the art could readily adapt the invention for use with other brands and/or types of trailer landing gear assemblies. A motor plate 132 is adapted for mounting an electric motor 134 thereto and, in this embodiment of the invention, is welded in place on the otherwise conventional gear housing cover 130, as shown in the view of FIG. 3.

Figure 4:
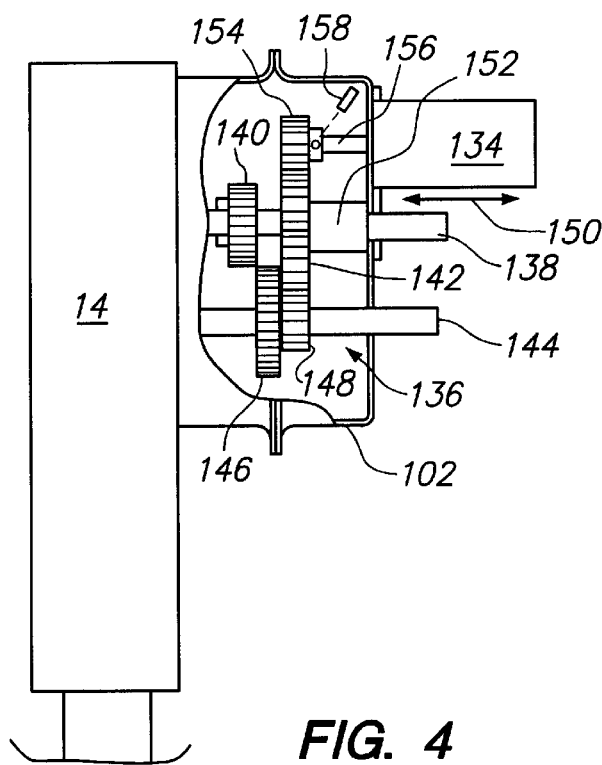
FIG. 4 is a partially cut away side elevational view of the gear assembly of FIGS. 2 and 3.

FIG. 4 is a diagrammatic partially cut away side elevational view of the inventive gear assembly 102, showing the relevant portion of a modified gear system 136 therein.

Relevant conventional portions of the gear system 136 are a drive shaft 138 having thereon a drive high gear 140 and a drive low gear 142. It should be noted that the drive shaft 138 is, except as noted herein, the same as the driving shaft 22 previously discussed herein in relation to FIG. 1, to which the crank handle 24 (FIG. 1) is generally affixed in the prior art. A driven shaft 144 has a driven high gear 146 and a driven low gear 148, as shown in the view of FIG. 4. As one skilled in the art will recognize, when the driven shaft 144 is turned, the leg 14 will be selectively raised and lowered, as will be the other leg (not visible in the view of FIG. 4) via a connecting shaft 160 (FIG. 2).

In a conventional gear assembly 102, the drive shaft 138 is selectively movable inward and outward as indicated by an arrow 150, such that one or the other pair, but not both, of the high gears 140 and 146 or the low gears 142 and 148 will mesh. However, in this embodiment of the invention a spacer 152 is provided, as shown in the view of FIG. 4, to force the drive shaft 142 to stay in position such that the low gear pair 142 and 148 are meshed. As can also be seen in the view of FIG. 4, a motor gear 154 is affixed to the shaft of the motor 134, positioned such that the motor gear 154 meshes with the low drive gear 142. In this embodiment of the invention, the motor gear 154 is affixed to a motor shaft 156 of the motor 134 by a roll pin 156. While a solid pin (not shown) could be used for the purpose, it is believed by the inventor that the roll pin 156 will provide a safety feature in that the roll pin 156 will shear if excessive force is put thereon.

Referring again to the view of FIG. 2, it should be noted that the motor 134 is powered by the battery 106 in the embodiment described herein, and the battery 106 is kept charged by connection to power lines that are available in essentially all trailers. A diode may optionally be provided between the battery 106 and such power lines to prevent discharge of the battery 106 back through the power lines of the trailer 30. Alternatively, it is within the scope of the invention that the battery 106 be eliminated and the motor 134 powered directly from electrical power already available in the trailer.

Figure 5:
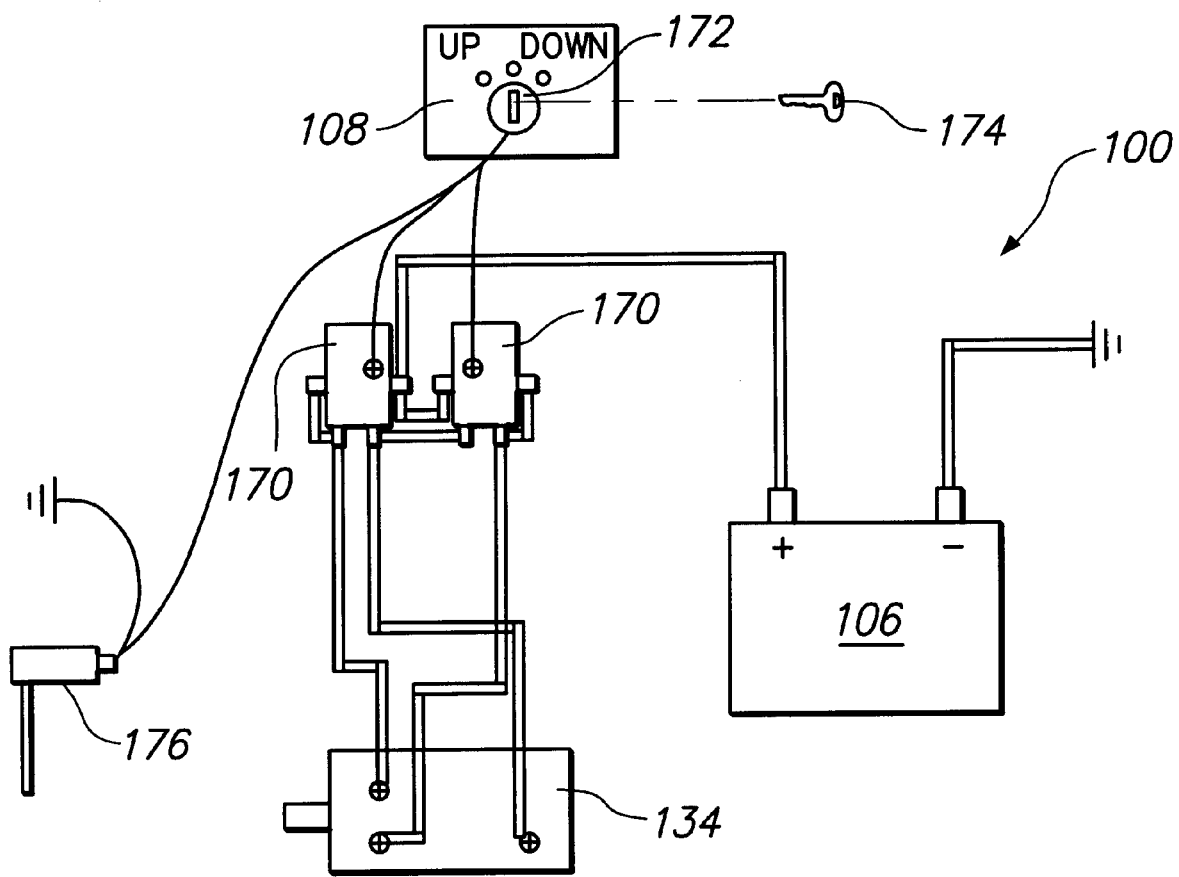
FIG. 5 is a block schematic diagram of a portion of an electrical control system according to an example of the present invention.

FIG. 5 is a block electrical schematic diagram of relevant portions of the trailer landing gear lifting apparatus 100. The motor 134 in this example of the invention is a reversible field motor, and power from the batter 106 is selectively provided to the motor 134 through a pair of solenoids (relays) which are controlled from a key switch 172 on the control panel 108. When a key 174 is inserted in the key switch 172 and rotated, the motor 136 is caused to rotate in a direction to raise or lower the leg (FIG. 14) according to the direction of rotation of the key 174. One skilled in the art will recognize that the two relay control system for controlling the direction of rotation of the motor 134 is a well known conventional arrangement, and wiring variations to adapt the invention to various types of motors, or other such variables, will be well within the knowledge of one skilled in the art, without undue experimentation.

In the present embodiment of the invention, a limiting switch 176 is positioned such that power is cut off from the motor 136 when the landing gear assembly (FIG. 1) is fully raised or lowered, thereby preventing damage to the trailer landing gear lifting apparatus 100. It is anticipated by the inventors that the electrical system may also be connected to the wiring system of the trailer (FIG. 1) such that power will not be provided to the motor 136 when the trailer 30 is not connected to a truck tractor (not shown). Again, one skilled in the art will recognize that the exact way to make this connection will depend upon the specific wiring of the particular trailer. However, adaptation of the invention to accommodate such connections will be well within the capabilities of any person skilled in the art.

As previously mentioned herein, many variations of the present invention are possible. Indeed, it is anticipated by the inventor that many variations will be produced as the invention is adapted in the future for use with different types of trailers, and for use with landing gear assemblies other than those specifically discussed herein.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The inventive trailer landing gear lifting apparatus 100 is intended to be widely used for raising and lowering the landing gear 10 of trailers 30. It is anticipated by the inventor that the trailer landing gear lifting apparatus 100 will be used in any of several different ways. For example, the trailer landing gear lifting apparatus 100 could be provided as a retrofit for existing trailers. In such examples, a modified gear housing cover 130 could be provided with the motor plate 132 welded thereto, and the motor 136 and motor gear 154 already installed thereon. Alternatively, it is also anticipated that trailers may be manufactured in the future with the inventive trailer landing gear lifting apparatus 100 already included.

In any event, it is anticipated that the attachment bracket described and claimed in the U.S. patent application Serial No. 09/075,494, entitled TRAILER LANDING GEAR LIFTING APPARATUS can optionally be used to mount the battery box 104 to the trailer 30. Briefly, the attachment bracket has a long bracket and a short bracket which are fastened together by a pair of attachment bracket bolts and nuts. The long bracket and the short bracket each have a curved end for fastening over the I beams of the trailer 30. In one embodiment, the long bracket is equipped with slots such that the short bracket can be positioned on the long bracket at the correct position such that the assembled attachment bracket will fit correctly over an adjacent pair of the I beams. The control panel 108 can optionally be affixed to the battery box 104 or elsewhere on the trailer 30, as required by the application.

In operation, the legs 14 of the trailer landing gear assembly 10 will be selectively raised and lowered by merely inserting the key 174 into the key switch 172 and rotating the key 174 in a direction designated to raise or lower the legs 14, as desired. The optional limit switch 176 will prevent operation past the desired physical limits of the landing gear assembly 10. Optional connections to the electrical system of the trailer 30, as discussed previously herein, will prevent operation of the inventive trailer landing gear lifting apparatus 100 when the trailer 30 is not connected to a tractor.

Since the trailer landing gear lifting apparatus 100 of the present invention may be readily produced and used with essentially any semi trailer, and since the advantages as described herein are provided, it is expected that it will be readily accepted in the industry. For these and other reasons, it is expected that the utility and industrial applicability of the invention will be both significant in scope and long-lasting in duration.

What is claimed is:

1. A trailer landing gear lifting apparatus for actuating the landing gear of a semi trailer, comprising:
   an electric motor with a motor gear affixed to a shaft thereof, said motor gear being adapted and positioned to engage a gear of the landing gear; and
   a spacer for locking the landing gear in a low gear position.

2. The trailer landing gear lifting apparatus of claim 1, wherein:
   the spacer is a tubular spacer placed about a drive shaft of the trailer landing gear.

3. The trailer landing gear lifting apparatus of claim 1, wherein:
   the spacer is placed between a drive low gear of the trailer landing gear and a motor plate.

* * * * *